(12) United States Patent
Zähe et al.

(10) Patent No.: US 11,105,433 B2
(45) Date of Patent: Aug. 31, 2021

(54) PRESSURE REDUCING-RELIEVING VALVE

(71) Applicant: Sun Hydraulics, LLC, Sarasota, FL (US)

(72) Inventors: Bernd Zähe, Sarasota, FL (US); Andy Borja, Sarasota, FL (US)

(73) Assignee: Sun Hydraulics, LLC, Sarasota, FL (US)

(*) Notice: Subject to any disclaimer, the term of this patent is extended or adjusted under 35 U.S.C. 154(b) by 50 days.

(21) Appl. No.: 16/654,834

(22) Filed: Oct. 16, 2019

(65) Prior Publication Data
US 2021/0116044 A1 Apr. 22, 2021

(51) Int. Cl.
*F16K 17/04* (2006.01)
*F16K 11/07* (2006.01)

(52) U.S. Cl.
CPC ...... *F16K 17/0473* (2013.01); *F16K 11/0716* (2013.01); *Y10T 137/0379* (2015.04)

(58) Field of Classification Search
CPC ............. F16K 17/0473; F16K 11/0716; F16K 11/0712; Y10T 137/0379; Y10T 137/86614
See application file for complete search history.

(56) References Cited

U.S. PATENT DOCUMENTS

| | | | |
|---|---|---|---|
| 6,644,350 B1 * | 11/2003 | Douglass | F16D 25/14 137/596.17 |
| 8,297,314 B2 * | 10/2012 | Clark | F16K 31/402 137/625.27 |
| 8,534,639 B1 * | 9/2013 | Van Weelden | F16K 31/0693 251/51 |
| 10,626,892 B1 * | 4/2020 | Zahe | F15B 13/0417 |
| 10,662,979 B1 * | 5/2020 | Zahe | F16K 31/42 |
| 10,683,879 B1 * | 6/2020 | Zahe | F15B 13/0442 |
| 10,753,488 B2 * | 8/2020 | Lampton | F16K 31/0613 |
| 2009/0224192 A1 * | 9/2009 | Oikawa | F16K 11/0716 251/129.15 |

* cited by examiner

*Primary Examiner* — Kevin R Barss
(74) *Attorney, Agent, or Firm* — McDonnell Boehnen Hulbert & Berghoff LLP (57) ABSTRACT

An example valve includes: a plurality of ports comprising: (i) a first port, (ii) a second port configured to be fluidly coupled to a reservoir, and (iii) a third port configured to be fluidly coupled to a source of fluid; a spool slidably accommodated in a sleeve; an annular chamber formed between the spool and the sleeve, wherein the annular chamber is fluidly coupled to the first port, and wherein a first flow area is formed between the spool and the sleeve to fluidly couple the annular chamber to the second port via the first flow area; and a solenoid coil, wherein when the solenoid coil is energized, a solenoid force the spool, thereby causing the spool to move, forming a second flow area between the spool and the sleeve to fluidly couple the third port to the annular chamber via the second flow area.

20 Claims, 5 Drawing Sheets

PRESSURE REDUCING-RELIEVING VALVE

BACKGROUND

A pressure-reducing valve can provide a steady pressure into a part of the system that operates at a pressure lower that normal system pressure. A pressure reducing valve can normally be set for a desired downstream pressure within its design limits.

A pressure relief valve is a valve used to control or limit the pressure in a system. Pressure might otherwise build up and can cause instrument or equipment failure. It may be desirable in some examples to combine or integrate a pressure relief function with a pressure reducing function. It is with respect to these and other considerations that the disclosure made herein is presented.

SUMMARY

The present disclosure describes implementations that relate to a pressure reducing-relieving valve.

In a first example implementation, the present disclosure describes a valve. The valve includes: (i) a plurality of ports comprising: a first port, a second port configured to be fluidly coupled to a reservoir, and a third port configured to be fluidly coupled to a source of fluid; (ii) a sleeve having a longitudinal cylindrical cavity therein; (iii) a spool slidably accommodated in the longitudinal cylindrical cavity of the sleeve; (iv) an annular chamber formed between an exterior surface of the spool and an interior surface of the sleeve, wherein the annular chamber is fluidly coupled to the first port, and wherein a first flow area is formed between the spool and the sleeve to fluidly couple the annular chamber to the second port via the first flow area; and (v) a solenoid actuator comprising: a solenoid coil, a pole piece, and an armature that is mechanically coupled to the spool. When the solenoid coil is energized, a solenoid force is applied to the armature and the spool coupled thereto, thereby causing the armature and the spool to move axially toward the pole piece, and forming a second flow area between the spool and the sleeve to fluidly couple the third port to the annular chamber via the second flow area, wherein the second flow area operates as a flow restriction such that fluid received at the annular chamber and the first port from the third port through the second flow area has a lower pressure level compared to pressure level received from the source at the third port.

In a second example implementation, the present disclosure describes a hydraulic system including a source of fluid; a reservoir; a directional control valve having a main spool shiftably disposed therein, and a pilot chamber disposed at an end of the main spool; and a valve comprising: a first port fluidly coupled to the pilot chamber of the directional control valve to provide a pilot pressure signal thereto and shift the main spool when the valve is actuated, a second port fluidly coupled to the reservoir, and a third port fluidly coupled to the source of fluid. The valve further comprises: (i) a sleeve having a longitudinal cylindrical cavity therein; (ii) a spool slidably accommodated in the longitudinal cylindrical cavity of the sleeve; (iii) an annular chamber formed between an exterior surface of the spool and an interior surface of the sleeve, wherein the annular chamber is fluidly coupled to the first port, and wherein a first flow area is formed between the spool and the sleeve to fluidly couple the annular chamber to the second port via the first flow area; and (iv) a solenoid actuator comprising: a solenoid coil, a pole piece, and an armature that is mechanically coupled to the spool. When the solenoid coil is energized to actuate the valve, a solenoid force is applied to the armature and the spool coupled thereto, thereby causing the armature and the spool to move axially toward the pole piece, and forming a second flow area between the spool and the sleeve to fluidly couple the third port to the annular chamber via the second flow area, wherein the second flow area operates as a flow restriction such that fluid received at the annular chamber and the first port from the third port through the second flow area has a lower pressure level compared to pressure level received from the source at the third port.

In a third example implementation, the present disclosure describes a method. The method includes: (i) receiving an electrical command signal energizing a solenoid coil of a valve, wherein the valve comprises: a first port, a second port configured to be fluidly coupled to a reservoir, a third port configured to be fluidly coupled to a source of fluid, a spool slidably accommodated within a sleeve, and an annular chamber formed between an exterior surface of the spool and an interior surface of the sleeve, wherein the annular chamber is fluidly coupled to the first port, and wherein a first flow area is formed between the spool and the sleeve to fluidly couple the annular chamber to the second port via the first flow area; (ii) in response to the electrical command signal, applying a solenoid force to the spool; (iii) causing the spool to move axially within the sleeve; (iv) forming a second flow area between the spool and the sleeve, thereby fluidly coupling the third port to the annular chamber via the second flow area; and (v) providing fluid from the third port through the second flow area to the annular chamber and the first port and from the annular chamber through the first flow area to the second port, wherein the first flow area and the second flow area operate as flow restrictions such that fluid received at the annular chamber and the first port from the third port through the second flow area and communicated from the annular chamber to the second port through the first flow area has a reduced pressure level compared to pressure level received from the source at the third port and a higher pressure level than pressure level at the second port.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

In example applications, a pressure reducing valve can be used as a source of pilot pressure signal that drives a pilot-operated main valve. For instance, a pilot-operated main valve can have a main spool therein that is movable axially in a bore. A pilot pressure signal provided to one side of the main spool causes the main spool to shift in a given direction, and a respective pilot pressure signal provided to the other side of the main spool causes the spool to shift in an opposite direction. The pressure reducing valve can be solenoid operated so that it is controlled proportionally to provide the pilot pressure signal at various desired levels.

In conventional pressure reducing valves configured to provide a pilot pressure signal to a main valve, fluid is provided through a channel inside a spool of the pressure reducing valve. Pressure level of the pilot signal generated by the pressure reducing valve is based on a diameter of the spool. The smaller the diameter, the higher the pressure level. Having fluid going through an internal channel of the spool limits how small the diameter of the spool can be made, and thus limits the maximum pressure level that the pressure reducing valve can generate.

Further, in conventional valves that are operated by a solenoid actuator, a solenoid tube of the solenoid actuator can be fluidly coupled to a reservoir containing pressure at a low level (e.g., atmospheric pressure). Such low pressure level can cause the solenoid tube to be not filled with fluid under some operating conditions and may cause gas (e.g., air) to be present within the solenoid tube. Under these circumstances, an armature moving within the solenoid tube can be subjected to instabilities (e.g., oscillations) and lack of lubrication.

Therefore, it may be desirable to have a pressure reducing valve that can generate higher pressure level and not be limited by an internal channel in a spool thereof. It may further be desirable to have the solenoid tube in fluid communication with a controlled port that has higher pressure level than a reservoir having low pressure level. It may also be desirable to integrate a pressure relief operation in the pressure reducing valve to protect the controlled port and components downstream thereof against pressure spikes.

Figure 1:
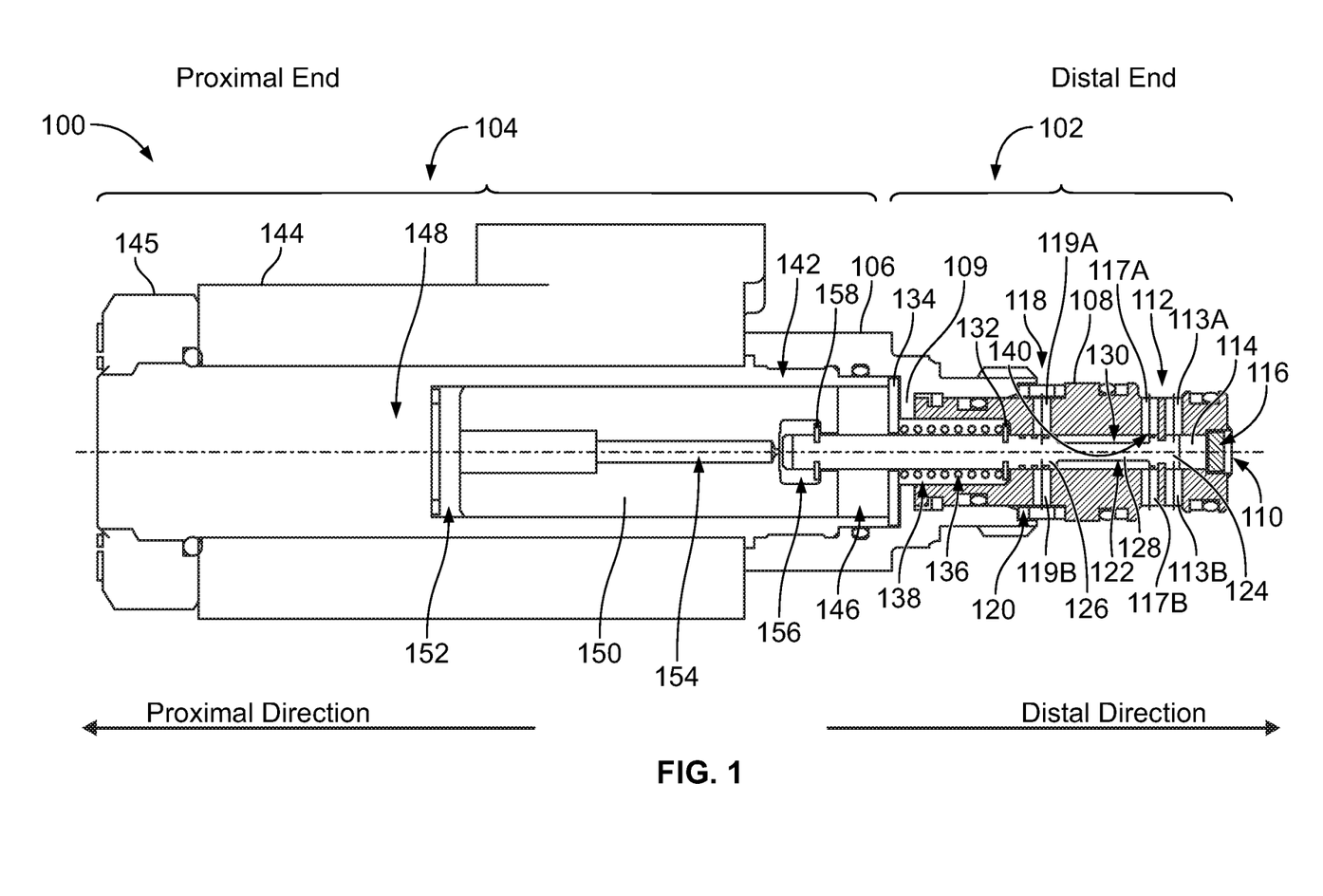
FIG. 1 illustrates a cross-sectional top view of a valve, in accordance with an example implementation.

FIG. 1 illustrates a cross-sectional top view of a valve 100, in accordance with an example implementation. The valve 100 may be inserted or screwed into a valve section of a valve assembly. The valve section can have fluid conduits that fluidly couple ports of the valve 100 described below to other components (e.g., pilot chambers at ends of a main spool disposed in the valve section) of a hydraulic system.

The valve 100 includes a pressure reducing valve section 102 and a solenoid actuator 104. The valve 100 includes a housing 106 having a longitudinal cylindrical cavity therein. The longitudinal cylindrical cavity of the housing 106 is configured to house parts of the pressure reducing valve section 102 and the solenoid actuator 104.

The valve 100 includes a sleeve 108 received at a distal end of the housing 106. A proximal end of the sleeve 108 rests against a shoulder 109 formed by an interior surface of the housing 106.

The valve 100 includes a first port 110 at a nose or distal end of the sleeve 108. The first port 110 can also be referred to as a controlled port and is configured to be fluidly coupled to, for example, a pilot chamber of a main valve to provide a pilot pressure signal thereto to shift a main spool.

The valve 100 also includes a second port 112. The second port 112 can be referred to as a tank or reservoir port and can be configured to be fluidly coupled to a tank or reservoir of hydraulic fluid. The reservoir can have fluid at a low pressure level, e.g., 0-70 pounds per square inch (psi). The second port 112 can include a first set of reservoir cross-holes, such as reservoir cross-holes 113A, 113B. The reservoir cross-holes 113A, 113B can be disposed in a radial or circumferential array about the sleeve 108. The reservoir cross-holes 113A, 113B are configured to fluidly couple the reservoir or the second port 112 to a reservoir chamber 114 formed within the sleeve 108. The term "cross-hole" indicates a hole that crosses a path of, or is formed transverse relative to, another hole, cavity, or channel.

The valve 100 includes a disk 116 that is swaged (e.g., compressed or press-fitted) within the sleeve 108. The disk 116 is configured to fluidly decouple or isolate the reservoir chamber 114 from the first port 110.

The second port 112 can also include a second set of reservoir cross-holes, such as reservoir cross-holes 117A, 117B. The reservoir cross-holes 117A, 117B can also be disposed in a respective circumferential array about the sleeve 108. The reservoir cross-holes 117A, 117B are axially-spaced from the reservoir cross-holes 113A, 113B as depicted in FIG. 1.

The valve 100 can further include a third port 118. The third port 118 can be referred to as an inlet port and is configured to be coupled to a source of fluid (e.g., a pump, an accumulator, etc.) capable of providing fluid at high pressures (e.g., 1000-5000 psi). The third port 118 can include a set of cross-holes that can be referred to as inlet flow cross-holes, such as inlet flow cross-holes 119A, 119B disposed in a radial or circumferential array about the sleeve 108.

With the configuration of the valve 100 shown in FIG. 1, the first port 110, the second port 112, and the third port 118 are axially-spaced along a length of the valve 100 such that the second port 112 (the reservoir port) is interposed between the first port 110 (the controlled port) and the third port 118 (the inlet port). The valve 100 can include a filter 120 that slides onto the sleeve 108 at the third port 118 to protect the valve 100 from contaminants in fluid provided from the source of fluid to the third port 118. The configuration of the ports 110, 112, and 118 enable the use of such a filter configuration. In assembling the valve 100, the filter 120 can slide onto the exterior peripheral surface of the sleeve 108, and the sleeve 108 can then be inserted in the housing 106. Conventional valves can have a different port configuration with the inlet port being interposed between the controlled port and the reservoir port. With such configuration, conventional valves include a clip filter disposed at the inlet port, and such a clip filter can be more costly than the filter 120.

The sleeve 108 includes a respective longitudinal cylindrical cavity therein. The valve 100 includes a spool 122 that is disposed, and slidably accommodated, in the longitudinal cylindrical cavity of the sleeve 108. The spool 122 can be referred to as a pilot spool as the valve 100 can be configured as a pilot valve that provides a pilot pressure signal to a main valve having a main spool. The spool 122 can also be referred to as a piston or movable element. Further, the term "slidably accommodated" is used throughout herein to indicate that a first component (e.g., the spool 122) is positioned relative to a second component (e.g., the sleeve 108) with sufficient clearance therebetween, enabling movement of the first component relative to the second component in the proximal and distal directions. As such, the first component (e.g., spool 122) is not stationary, locked, or fixedly disposed in the valve 100, but rather, is allowed to move relative to the second component (e.g., the sleeve 108).

The spool 122 can have a plurality of substantially cylindrical lands, such as land 124 and land 126, alternately-spaced with recessed regions such as recessed region 128. With this configuration, a ring-shaped or annular chamber 130 is formed between an exterior surface of the spool 122 at the recessed region 128 and an interior surface of the sleeve 108. The valve 100 is configured such that the annular chamber 130 is continually in fluid communication with, or is fluidly coupled to, the first port 110 as described next with respect to FIG. 2.

Figure 2:
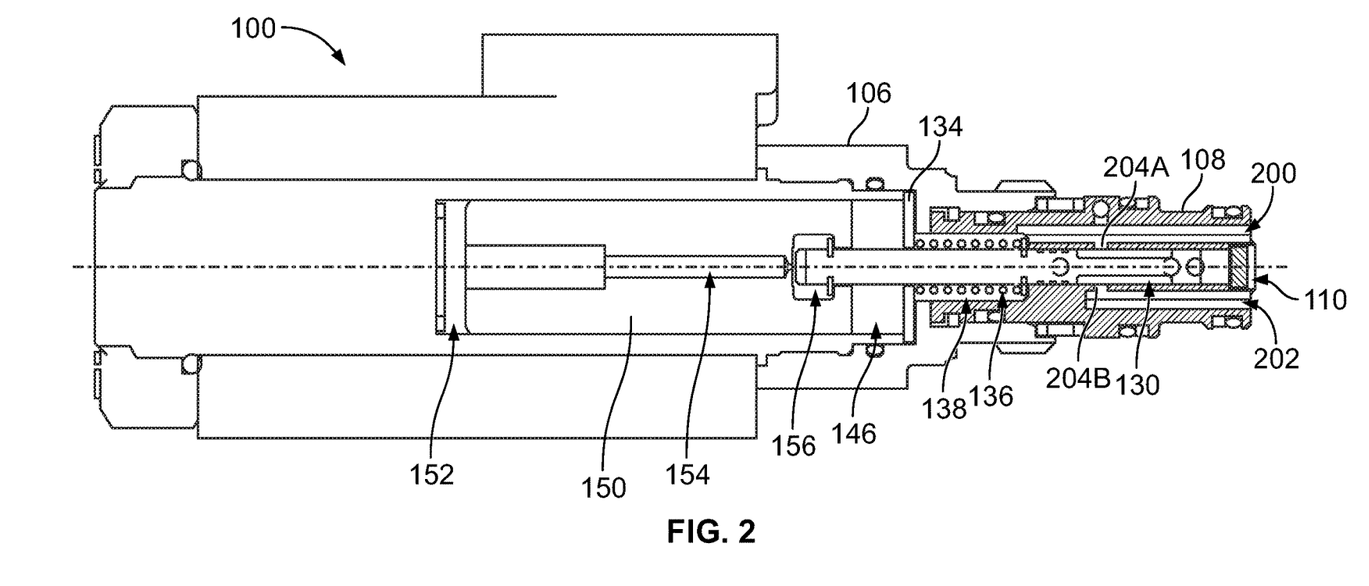
FIG. 2 illustrates a cross-sectional side view of the valve of FIG. 1, in accordance with an example implementation.
Figure 3:
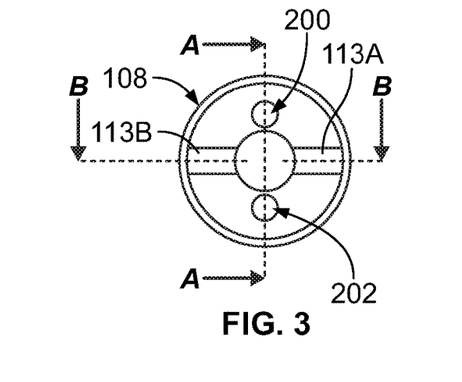
FIG. 3 illustrates a cross-sectional front or end view of the valve shown in FIGS. 1-2, in accordance with another example implementation.

FIG. 2 illustrates a cross-sectional side view of the valve 100, and FIG. 3 illustrates a cross-sectional front or end view of the valve 100, in accordance with an example implementation. The cross-sectional bottom view of FIG. 1 is the cross-sectional view labelled 'B' in FIG. 3, and the cross-sectional side view of FIG. 2 is the cross-sectional view labelled 'A' in FIG. 3. Thus, the plane of the cross-sectional view of FIG. 1 is oriented 90 degrees from the plane of the cross-sectional side view of FIG. 2.

Referring to FIG. 2, the sleeve 108 comprises a first longitudinal channel 200 and a second longitudinal channel 202 disposed therein. The longitudinal channels 200, 202 are fluidly coupled to the first port 110. Further, the sleeve 108 includes cross-holes 204A, 204B that fluidly couple the longitudinal channels 200, 202, respectively, to the annular chamber 130 as shown in FIG. 2. Thus, with this configuration, the annular chamber 130 is continually in fluid communication with, or fluidly coupled to, the first port 110.

Notably, the longitudinal channels 200, 202 are symmetrically disposed about the spool 122. Such symmetrical configuration of having two longitudinal channels 200, 202 on both sides of the spool 122 ensures that fluid is provided to both sides of the spool 122 via the cross-holes 204A, 204B and therefore precludes side loading on the spool 122, which can cause more undesired friction to movement of the spool 122. Further, if in some applications higher flow rate is expected or desired, more longitudinal channels can be formed (e.g., four longitudinal channels rather than two).

Referring back to FIG. 1, the valve 100 includes a washer or ring 132 disposed in a groove formed in an exterior peripheral surface of the spool 122 and protruding radially outward therefrom. The ring 132 can thus move along with the spool 122. The valve 100 further includes a ring-shaped member 134 fixedly disposed within the housing 106.

The valve 100 includes a spring 136 disposed in a chamber 138 formed within the sleeve 108. The spring 136 is disposed about an exterior peripheral surface of the spool 122 between the ring 132 and the ring-shaped member 134. Particularly, the ring-shaped member 134 forms a support for a proximal end of the spring 136, whereas a distal end of the spring 136 rests against the ring 132. Thus, the proximal end of the spring 136 is fixed, whereas the distal end of the spring 136 is movable and interfaces with the spool 122 via the ring 132. With this configuration, the spring 136 is configured to bias the spool 122 in a distal direction (e.g., to the right in FIG. 1) toward the sleeve 108.

The axial position of the spool 122 shown in FIG. 1 is an unactuated position, i.e., is the position of the spool 122 when the valve 100 is in an unactuated state. In the axial position of the spool 122 depicted in FIG. 1, the ring 132 interfaces with the sleeve 108 and the spool 122 cannot move further in the distal direction than such axial position.

Also, in the axial position shown in FIG. 1, the land 126 of the spool 122 blocks the inlet flow cross-holes 119A, 119B. The term "block" is used throughout herein to indicate substantially preventing fluid flow except for minimal or leakage flow of drops per minute, for example.

Further, in the axial position shown in FIG. 1 (the unactuated state of the valve 100), the annular chamber 130 is fluidly coupled to the reservoir cross-holes 117A, 117B of the second port 112 via annular opening or annular flow area 140. The annular flow area 140 is formed between a proximal edge of the land 124 of the spool 122 and a proximal edge of the reservoir cross-holes 117A, 117B of the sleeve 108. The annular flow area 140 is thus a spool-to-sleeve cylindrical opening, the size of which can vary based on the axial position of the spool 122. As described above with respect to FIG. 2, the first port 110 is fluidly coupled to the annular chamber 130, and therefore in the unactuated state of the valve 100, the first port 110 is fluidly coupled to the second port 112, which is fluidly coupled to a reservoir.

The solenoid actuator 104 includes a solenoid tube 142 configured as a cylindrical housing or cylindrical body disposed within and received at a proximal end of the housing 106, such that the solenoid tube 142 is coaxial with the housing 106. As shown, the ring-shaped member 134 is secured in position between a distal end of the solenoid tube 142 and the shoulder 109 of the housing 106.

A solenoid coil 144 can be disposed about an exterior surface of the solenoid tube 142. The solenoid coil 144 is retained between a proximal end of the housing 106 and a coil nut 145 having internal threads that can engage a threaded region formed on the exterior peripheral surface of the solenoid tube 142 at its proximal end.

The solenoid tube 142 further has a solenoid chamber 146 defined within a distal side of the solenoid tube 142. The solenoid tube 142 further includes a pole piece 148 composed of material of high magnetic permeability.

The solenoid tube 142 is configured to house a plunger or armature 150 in the solenoid chamber 146. The armature 150 is slidably accommodated within the solenoid tube 142 (i.e., the armature 150 can move axially within the solenoid tube 142). The pole piece 148 can be separated from the armature 150 by a gap 152.

The armature 150 includes a longitudinal channel 154 comprising an annular internal groove 156 formed by an interior peripheral surface of the armature 150. The annular internal groove 156 is formed as a recessed portion configured to receive another washer or ring 158 disposed in a groove formed in an exterior peripheral surface of the spool 122 and protruding radially outward therefrom in the annular internal groove 156. Thus, the ring 158 interacts with the armature 150, thereby causing the spool 122 to be mechanically-coupled or linked to the armature 150. This way, axial motion of the armature 150 causes the spool 122 to move therewith.

Referring to FIG. 2, the longitudinal channels 200, 202 are fluidly coupled to the chamber 138. The chamber 138 in turn is fluidly coupled through unsealed spaces to the solenoid chamber 146, the longitudinal channel 154, and the gap 152. With this configuration, the solenoid tube 142 is filled with fluid having the same pressure level as pressure level at the first port 110.

During operation of the valve 100, as described below, pressure level at the first port 110 is reduced from (i.e., is lower than) pressure level of fluid provided to the third port 118 (inlet port), but is higher than pressure level at the second port 112 (which is fluidly coupled to a reservoir). As such, the solenoid tube 142 is filled with pressurized fluid that provides lubrication and damping of motion of the armature 150 to reduce the likelihood of instability (e.g., oscillation of the armature 150). This contrasts with conventional valves where a solenoid tube is fluidly coupled to the tank port and thus pressure level therein can be low (e.g., atmospheric), thereby increasing the likelihood of instability.

The valve 100 is actuated or operates in an actuated state when the solenoid coil 144 is energized (e.g., when an electric current is provided to the solenoid coil 144). When an electrical current is provided through the windings of the solenoid coil 144, a magnetic field is generated. The pole piece 148 directs the magnetic field through the gap 152 toward the armature 150, which is movable and is attracted toward the pole piece 148. In other words, when an electrical current is applied to the solenoid coil 144, the generated magnetic field forms a north and south pole in the pole piece 148 and the armature 150. Thus, a solenoid force is generated to attract the pole piece 148 and the armature 150 toward each other. The pole piece 148 is fixed, whereas the armature 150 is movable, and therefore the solenoid force is a pulling force that tends to pull the armature 150 in the proximal direction (to the left in FIG. 1). The solenoid force is proportional to a magnitude of the electrical command or signal (e.g., magnitude of electrical current or voltage applied to the solenoid coil 144).

Figure 4:
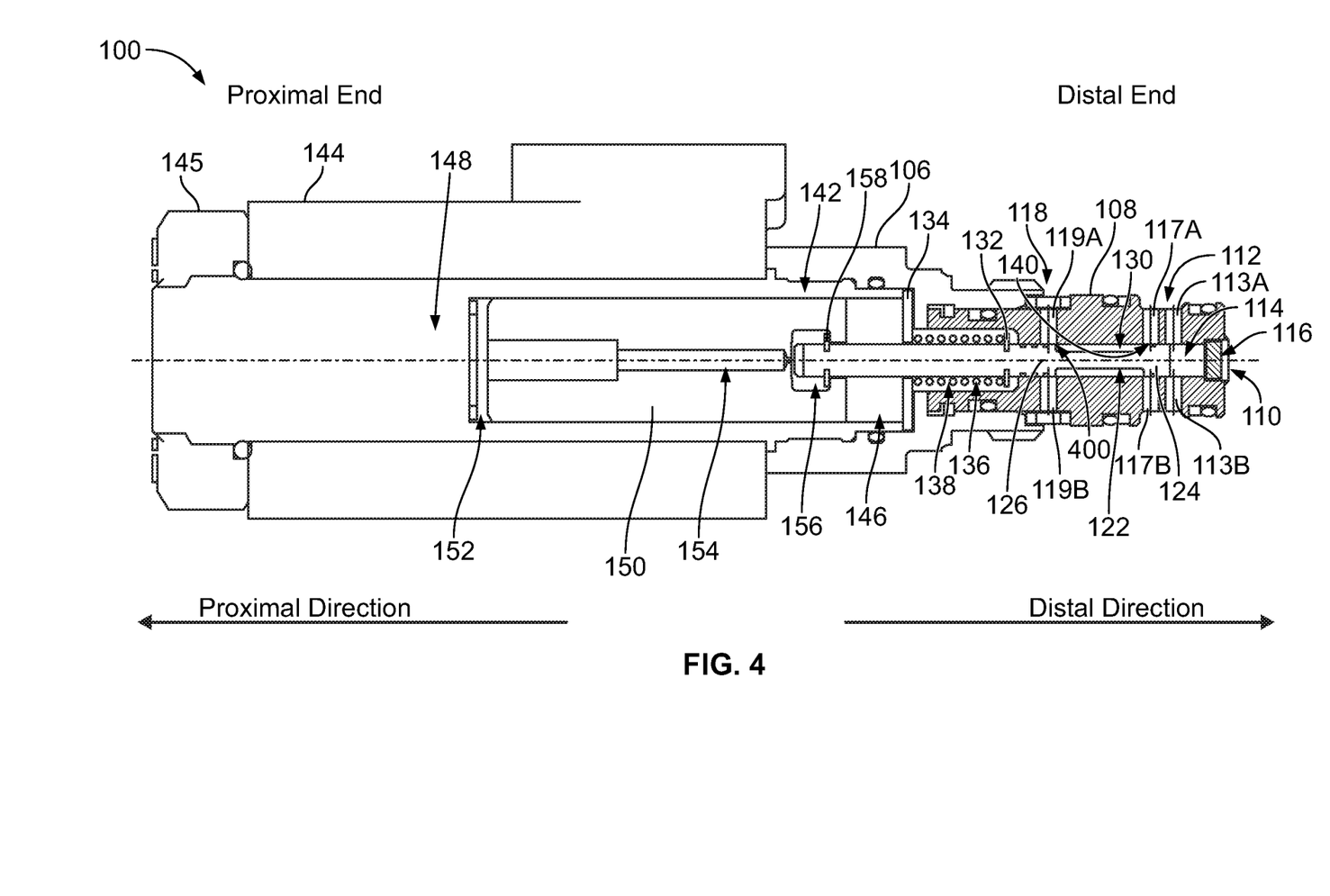
FIG. 4 illustrates a cross-sectional top view of the valve of FIG. 1 with a solenoid coil being energized to provide pressurized fluid to a first port, in accordance with an example implementation.

FIG. 4 illustrates a cross-sectional top view of the valve 100 with the solenoid coil 144 being energized (i.e., when the valve 100 is actuated) to provide pressurized fluid to the first port 110, in accordance with an example implementation. As mentioned above, the spool 122 is coupled to the armature 150 due to engagement of the ring 158 with the armature 150 at the annular internal groove 156 of the armature 150. Thus, when the solenoid force applied to the armature 150 overcomes the biasing force of the spring 136, the armature 150 and the spool 122 can move axially in the proximal direction (e.g., to the left in FIG. 4). For instance, when the commanded electric current is equal to or greater than 20% of the maximum command (e.g. when the solenoid force is 20% or more of the maximum solenoid force), the biasing force of the spring 136 can be overcome by the solenoid force, and both the armature 150 and the spool 122 move in the proximal direction (e.g., to the left in FIG. 4).

As the spool 122 moves in the proximal direction by a particular axial distance, a distal edge of the land 126 may expose a portion of the inlet flow cross-holes 119A, 119B to form an annular opening or annular flow area 400. The annular flow area 400 is formed between the distal edge of the land 126 of the spool 122 and the distal edges of the inlet flow cross-holes 119A, 119B of the sleeve 108. The annular flow area 400 is a spool-to-sleeve cylindrical opening, the size of which can vary based on the axial position of the spool 122.

With this configuration, fluid received at the third port 118 can flow through the inlet flow cross-holes 119A, 119B and the annular flow area 400 to the annular chamber 130. As mentioned above with respect to FIG. 2, the annular chamber 130 is fluidly coupled to the first port 110 via the longitudinal channels 200, 202. Therefore, fluid provided to the annular chamber 130 is also provided to the first port 110, and pressure level $P_1$ at the first port 110 is equal to pressure level of fluid in the annular chamber 130.

The annular flow area 400 operates as a flow restriction. Thus, as a result of fluid flow through the annular flow area 400, a pressure drop occurs between pressure level at the third port 118 (i.e., pressure level $P_3$) and the pressure level $P_1$ in the annular chamber 130. Using the Bernoulli orifice equation, the fluid flow rate Q through the annular flow area 400 can be determined as:

$$Q = K_1 \sqrt{(P_3 - P_1)} \quad (1)$$

where $K_1$ is a variable that is proportional to the size of the annular flow area 400, which is determined based on the magnitude of the command signal to the solenoid coil 144 that determines the axial position of the spool 122.

The fluid flowing through the annular flow area 400 also flows from the annular chamber 130 through the annular flow area 140 to the second port 112 at the same flow rate Q. The annular flow area 140 also operates as a flow restriction. Thus, the flow rate Q can also be expressed as a function of pressure drop across the pressure annular flow are 140 as follows:

$$Q = K_2 \sqrt{(P_1 - P_2)} \quad (2)$$

where $P_2$ is the pressure level at the second port 112 (which can be zero psi) and where $K_2$ is a variable that is proportional to the size of the annular flow area 140, which is determined based on the axial position of the spool 122. The pressure drop across the annular flow area 400 causes the pressure level $P_1$ to become lower than, or reduced compared to, $P_3$ at the third port 118 (at the inlet port). However, the pressure level $P_1$ is larger than $P_2$ due to the pressure drop across the annular flow area 140.

The spool 122 moves axially until a force equilibrium is achieved between the solenoid force, the biasing force of the spring 136, and the fluid forces acting on the spool 122. In particular, a solenoid force ($F_{Sol}$) acts on the spool 122 in the proximal direction and the biasing force ($F_{Sp}$) of the spring 136 acts on the spool 122 in the distal direction.

Further, fluid in the annular chamber 130 (and at the first port 110) is communicated to the annular internal groove 156 as mentioned above and applies a first fluid force ($F_{F1}$) on the spool 122 in the distal direction. Particularly, fluid from the annular chamber 130 communicated to the annular internal groove 156 acts on a surface area ($A_{sp}$) of a proximal end of the spool 122 having a diameter ($D_{sp}$), and thus the first fluid force $$F_{F2} = P_2 \cdot A_{sp} = P_2 \cdot \pi \frac{D_{sp}^2}{4}.$$

Also, fluid in the reservoir chamber 114 (which is fluid at the second port 112) applies a second fluid force ($F_{F2}$) on the spool 122 in the proximal direction. Particularly, fluid in the reservoir chamber 114 acts on the surface area of a distal end of the spool 122 which can have the same diameter ($D_{sp}$), and thus the second fluid force $$F_{F1} = P_1 \cdot A_{sp} = P_1 \cdot \pi \frac{D_{sp}^2}{4}.$$

Thus, a force equilibrium equation of forces acting on the spool 122 can be expressed as follows:

$$F_{Sol} + F_{F2} = F_{Sp} + F_{F1} \quad (3)$$

Assuming that pressure level $P_2$ at the second port 112 and in the reservoir chamber 114 is substantially zero psi, equation (3) becomes:

$$F_{Sol} - F_{Sp} = F_{F1} = P_1 \cdot A_{sp} \quad (4)$$

Based on equation (4), the spool 122 can move axially to a particular axial position where the pressure level $P_1$ reaches a level that achieves the force equilibrium as expressed by equation (4). Particularly, the pressure level $P_1$ that achieves the force equilibrium can be expressed as:

$$P_1 = \frac{(F_{Sol} - F_{Sp})}{A_{sp}} \quad (5)$$

As an example for illustration, assuming the solenoid force ($F_{Sol}$) is 6 pound-force (lbs), the biasing force ($F_{Sp}$) is 1.5 lbs, and the diameter ($D_{sp}$) of the spool 122 is 0.125 inches (in), which results in an area ($A_{sp}$) of 0.0123 in$^2$, the pressure level ($P_1$) is about 390 psi. Notably, in contrast to conventional pressure reducing valves, fluid is not provided to the first port 110 through a channel within the spool 122, but is rather provided through the annular chamber 130 and the longitudinal channels 200, 202. As such, if a higher pressure level ($P_1$) is desired at the first port 110 in some application, the spool 122 can be made with a smaller diameter. For instance, if the diameter ($D_{sp}$) of the spool 122 is reduced to 0.093 inches (in), the pressure level ($P_1$) can be determined by equation (5) to be about 700 psi.

Also, changing the solenoid force ($F_{Sol}$) causes the pressure level ($P_1$) to change as well. Particularly, changing the magnitude of the electric current command to the solenoid coil 144 changes the solenoid force, thereby causing the spool 122 to move axially to another equilibrium position and changing the pressure level ($P_1$). For example, increasing the solenoid force ($F_{Sol}$) can move the spool 122 further in the proximal direction (to the left in FIG. 4), thereby: (i) increasing the size of the annular flow area 400, (ii) increasing the pressure level ($P_1$) as the pressure drop across the annular flow are 400 is decreased, and (iii) decreasing the size of the annular flow area 140. Conversely, decreasing the solenoid force ($F_{Sol}$) can cause the spool 122 to move further in the distal direction (to the right in FIG. 4), thereby: (i) decreasing the size of the annular flow area 400, (ii) decreasing the pressure level ($P_1$) as the pressure drop across the annular flow are 400 is increased, and (iii) increasing the size of the annular flow area 140. This way, the axial position of the spool 122, the amount of fluid flow through the annular flow areas 400, 140, and the pressure level ($P_1$) can be modulated continually based on a magnitude of the electric command to the solenoid coil 144. The axial position of the spool 122, the amount of fluid flow through the annular flow areas 400, 140, and the pressure level ($P_1$) can also be responsive to changes in the pressure levels $P_1$, $P_2$, and $P_3$ during operation of the valve 100 in a hydraulic system.

Notably, the valve 100 has a pressure relieving function integrated with the pressure reducing function. Particularly, if a pressure spike (e.g., a sudden increase) occurs in the pressure level ($P_1$) at the first port 110, the fluid force ($F_{F1}$) acting on the spool 122 in the distal direction increases, thereby causing the spool 122 to move in the distal direction, restricting the annular flow area 400 and reducing the pressure level in the annular chamber 130, which is also the pressure level ($P_1$) provided to the first port 110. This way, pressure level ($P_1$) at the first port 110 is precluded from increasing beyond a threshold valve and damaging the valve 100 or other components downstream from the valve 100.

The valve 100 can be used in various hydraulic systems. For example, can be configured to provide a pilot pressure signal to a main valve to actuate the main valve. If the main valve has a main spool that can shift in both directions, then two valves 100 can be used, where each of the two valves 100 can shift the main spool in a respective direction.

Figure 5:
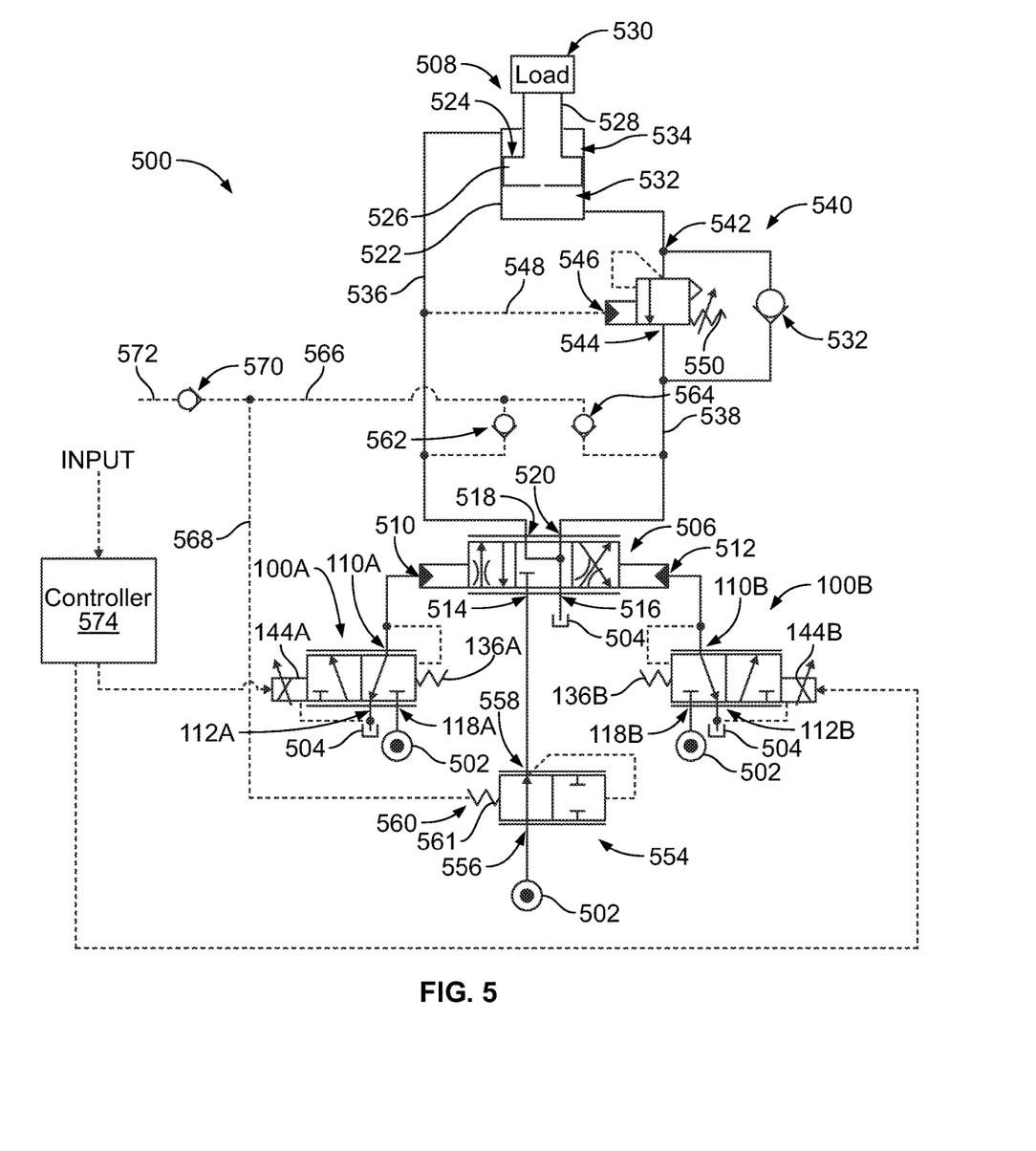
FIG. 5 illustrates a hydraulic system, in accordance with an example implementation.

FIG. 5 illustrates a hydraulic system 500, in accordance with an example implementation. The hydraulic system 500 includes two valves 100A, 100B that each symbolically represents the valve 100. The valves 100A, 100B have the same components of the valve 100. Therefore, the components or elements of the valves 100A, 100B are designated with the same reference numbers used for the valve 100 with an "A" or "B" suffix to correspond to the valves 100A, 100B, respectively.

The hydraulic system 500 includes a source 502 of fluid. The source 502 of fluid can, for example, be a pump or an accumulator configured to provide fluid to the third ports 118A, 118B of the valves 100A, 100B. Such pump can be a fixed displacement pump, a variable displacement pump, or a load-sensing variable displacement pump, as examples. Additionally or alternatively, the source 502 of fluid can be an accumulator. In FIG. 5, the source 502 is depicted in various locations and is designated by the same reference number to avoid having many fluid connections throughout the drawing and reduce visual clutter in the drawing. However, it should be understood that in practice, a single source of fluid can be configured to provide fluid to the various hydraulic consumers (e.g., various valves) in the hydraulic system 500.

The hydraulic system 500 also includes a reservoir 504 of fluid that can store fluid at a low pressure level (e.g., 0-70 psi). The second ports 112A, 112B of the valves 100A, 100B are respectively fluidly coupled to the reservoir 504. The source 502 of fluid can be configured to receive fluid from the reservoir 504, pressurize the fluid, then provide pressurized fluid to the third ports 118A, 118B of the valves 100A, 100B, respectively. Similar to the source 502, the reservoir 504 is depicted in various locations in FIG. 5 to reduce visual clutter in the drawing. However, it should be understood that in practice, a single reservoir can be configured to receive fluid discharged from the various hydraulic components (e.g., various valves) in the hydraulic system 500.

The valves 100A, 100B are configured to operate as pilot valves configured to provide pilot pressure signals to a directional control valve 506 that controls fluid flow to and from an actuator 508. The directional control valve 506 can be configured as a four-way, three-position valve, for example as depicted symbolically in FIG. 5. The directional control valve 506 can have a first pilot port 510 fluidly coupled to the first port 110A of the valve 100A. The directional control valve 506 can also have a second pilot port 512 fluidly coupled to the first port 110B of the valve 100B.

The directional control valve 506 can further have an inlet port 514, a reservoir port 516, a first workport 518, and a second workport 520. The directional control valve 506 can have a main spool therein that is shiftable within a valve body of the directional control valve 506. If the valve 100A provides a pilot pressure signal to the first pilot port 510 of the directional control valve 506, the main spool shifts in a first direction to fluidly couple the inlet port 514 to the first workport 518 and fluidly couple the second workport 520 to the reservoir port 516. Conversely, if the valve 100B provides a pilot pressure signal to the second pilot port 512 of the directional control valve 506, the main spool shifts in a second direction to fluidly couple the inlet port 514 to the second workport 520 and fluidly couple the first workport 518 to the reservoir port 516.

The actuator 508 includes a cylinder 522 and a piston 524 slidably accommodated in the cylinder 522. The piston 524 includes a piston head 526 and a rod 528 extending from the piston head 526 along a central longitudinal axis direction of the cylinder 522. The rod 528 is coupled to a load 530. The piston head 526 divides the inside space of the cylinder 522 into a first chamber 532 and a second chamber 534. The actuator 508 is depicted and described herein as a hydraulic cylinder actuator; however, it should be understood that a hydraulic rotary actuator (e.g., hydraulic motor) can also be used.

As shown in FIG. 5, the first workport 518 of the directional control valve 506 is fluidly coupled to the second chamber 534 of the actuator 508 via a fluid line 536, whereas the second workport 520 of the directional control valve 506 is fluidly coupled to the first chamber 532 of the actuator 508 via a fluid line 538. In examples, the hydraulic system 500 can include a counterbalance valve 540 disposed in the fluid line 538 and configured to preclude uncontrollable lowering of the load 530 and cavitation in the second chamber 534. Particularly, the counterbalance valve 540 can be configured to control or restrict fluid forced out of the first chamber 532.

The counterbalance valve 540 can have a load port 542 fluidly coupled to the first chamber 532, a port 544 fluidly coupled via the fluid line 538 to the second workport 520 of the directional control valve 506, and a pilot port 546. A pilot line 548 tapped from the fluid line 536 is fluidly coupled to the pilot port 546 of the counterbalance valve 540.

The counterbalance valve 540 has a setting spring 550. The counterbalance valve 540 can be configured such that a pilot pressure fluid signal received through the pilot line 548 at the pilot port 546 acts together with the pressure induced in the first chamber 532 due to the load 530 against a force generated by the setting spring 550. The combined action of the pilot pressure fluid signal and the induced pressure in the first chamber 532 facilitates opening the counterbalance valve 540 and forming the restriction therein to allow flow therethrough from the load port 542 to the port 544.

If the piston 524 tends to increase its speed, pressure level in the second chamber 534 and the pilot line 548 may decrease. As a result, the counterbalance valve 540 restricts fluid flow therethrough to preclude the load 530 from dropping at large speeds (i.e., precludes the load 530 from overrunning).

The counterbalance valve 540 can further include a check valve 552. The check valve 552 can allow free flow (e.g., flow causing minimal pressure drop across the check valve 552) from the port 544 to the load port 542.

In examples, the hydraulic system 500 can include a pressure compensator valve 554. The pressure compensator valve 554 can include an inlet port 556 configured to received fluid flow from the source 502 and can include an outlet port 558 configured to provide fluid to the inlet port 514 of the directional control valve 506. The pressure compensator valve 554 can also include a load-sense (LS) port 560 configured to receive an LS signal. The pressure compensator valve 554 can further include a spring 561 configured to apply a particular force or pressure on a pressure compensation spool within the pressure compensator valve 554.

The hydraulic system 500 can include a first LS check valve 562 fluidly coupled to the fluid line 536 and a second LS check valve 564 fluidly coupled to the fluid line 538. With this configuration, an LS pressure signal having a pressure level that is the higher of the two pressure levels of the fluid lines 536, 538 can be provided to an LS fluid line 566. A valve LS fluid line 568 can then provide the LS pressure signal from the LS fluid line 566 to the LS port 560 of the pressure compensator valve 554.

With this configuration, the pressure compensator valve 554 can sense the pressure level at the inlet port 556 and the pressure level of the LS pressure signal at the LS port 560. Responsively, the pressure compensation spool moves in the fluid path from the inlet port 556 to the outlet port 558 so as to provide fluid at the outlet port 558 at a pressure level that is higher than the pressure level of the LS pressure signal by a value of the pressure that the spring 561 applies to the pressure compensation spool (e.g., 200 psi). In other words, the pressure compensator valve 554 can be configured to maintain a particular pressure drop or pressure differential across the directional control valve 506.

In examples, if the source 502 is a variable displacement load-sensing pump, the hydraulic system 500 can further include a pump LS check valve 570 that can provide the LS pressure signal from the LS fluid line 566 to a pump LS fluid line 572. The pump LS fluid line 572 can be fluidly coupled to a pump LS port to provide the LS pressure signal thereto. The pump can responsively provide fluid flow to the pressure compensator valve 554 at a pressure level that is equal to pressure level at the pump LS port plus a margin pressure (e.g., 300 psi).

The hydraulic system 500 can further include a controller 574. The controller 574 can include one or more processors or microprocessors and may include data storage (e.g., memory, transitory computer-readable medium, non-transitory computer-readable medium, etc.). The data storage may have stored thereon instructions that, when executed by the one or more processors of the controller 574, cause the controller 574 to perform operations described herein. Signal lines to and from the controller 574 are depicted as dashed lines in FIG. 5.

The controller 574 can receive input or input information comprising sensor information via signals from various sensors or input devices in the hydraulic system 500, and in response provide electrical signals to various components of the hydraulic system 500. For example, the controller 574 can receive a command or an input (e.g., from a joystick of a machine) to move the piston 524 in a given direction at a particular desired speed (e.g., to extend or retract the piston 524). The controller 574 can then provide a signal to the valve 100A or the valve 100B to move the piston 524 in the commanded direction and at a desired commanded speed in a controlled manner.

For example, to extend the piston 524 (i.e., move the piston 524 upward in FIG. 5), the controller 574 can send a command signal to the solenoid coil 144B of the valve 100B to actuate it and provide a pilot pressure signal from the first port 110B of the valve 100 to the second pilot port 512 of the directional control valve 506. The pressure level of the pilot pressure signal is proportional to the magnitude of the command signal to the solenoid coil 144B.

As a result, the main spool of the directional control valve 506 shifts to a particular axial position that is proportional to the pressure level of the pilot pressure signal. In response to the main spool shifting, fluid flow is provided from the inlet port 514 to the second workport 520 at a flow rate that is proportional to the axial position of the main spool. Fluid then flows via the fluid line 538 and the check valve 552 to the first chamber 532 of the actuator 508 to extend the piston 524. As the piston 524 extends, fluid is forced out of the second chamber 534 and is provided through the fluid line 536 to the first workport 518 of the directional control valve 506, then to the reservoir port 516, and then to the reservoir 504. As such, the piston 524 retracts at a speed that is based on the magnitude of the command signal provided to the solenoid coil 144B.

To retract the piston 524 (i.e., move the piston 524 downward in FIG. 5), the controller 574 can send a command signal to the solenoid coil 144A of the valve 100A to actuate it and provide a pilot pressure signal from the first port 110A of the valve 100A to the first pilot port 510 of the directional control valve 506. The pressure level of the pilot pressure signal is proportional to the magnitude of the command signal to the solenoid coil 144A.

As a result, the main spool of the directional control valve 506 shifts to a particular axial position that is proportional to the pressure level of the pilot pressure signal. In response to the main spool shifting, fluid flow is provide from the inlet port 514 to the first workport 518 at a flow rate that is proportional to the axial position of the main spool. Fluid then flows via the fluid line 536 to the second chamber 534 of the actuator 508 to retract the piston 524. As the piston 524 retracts, fluid is forced out of the first chamber 532 and is provided to the load port 542 of the counterbalance valve 540.

In addition to fluid being provided to the second chamber 534 via the fluid line 536, a pilot pressure signal is provided from the fluid line 536 through the pilot line 548 to the pilot port 546 of the counterbalance valve 540. The pilot pressure signal provided to the pilot port 546 of the counterbalance valve 540 actuates the counterbalance valve 540 to allow fluid provided to the load port 542 from the first chamber 532 to flow to the port 544, which is fluidly coupled to the second workport 520 of the directional control valve 506. Fluid then flows through the directional control valve 506 from the second workport 520 to the reservoir port 516, and then to the reservoir 504. As such, the piston 524 retracts at a speed that is based on the magnitude of the command signal provided to the solenoid coil 144A.

Figure 6:
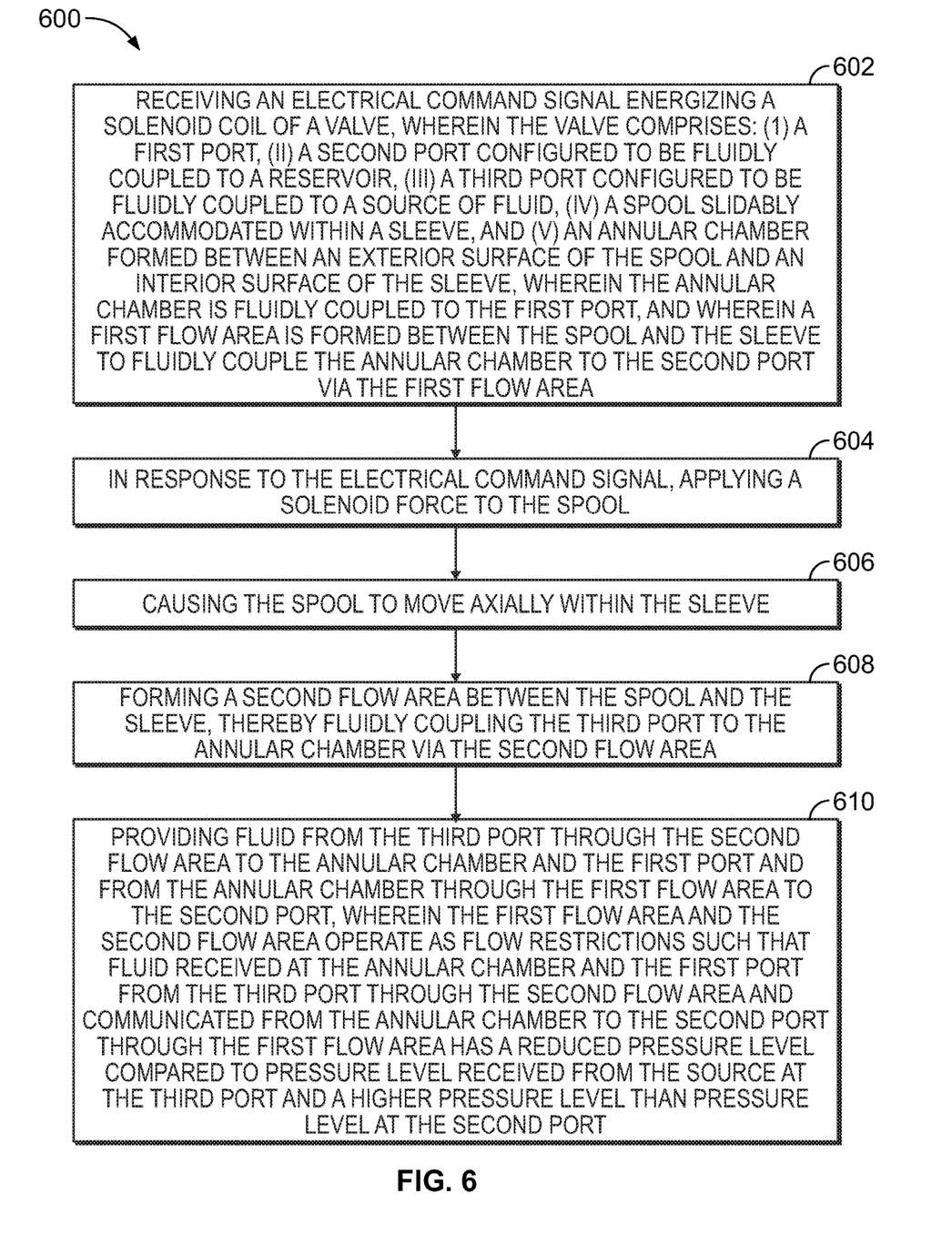
FIG. 6 is a flowchart of a method for operating a valve, in accordance with an example implementation.

FIG. 6 is a flowchart of a method 600 for operating a valve, in accordance with an example implementation. The method 600 shown in FIG. 6 presents an example of a method that can be used with the valve 100 (e.g., the valves 100A, 100B) shown throughout the Figures, for example. The method 600 may include one or more operations, functions, or actions as illustrated by one or more of blocks 602-610. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 includes receiving an electrical command signal energizing the solenoid coil 144 of the valve 100, wherein the valve 100 comprises: (i) the first port 110, (ii) the second port 112 configured to be fluidly coupled to a reservoir, (iii) the third port 118 configured to be fluidly coupled to a source of fluid; (iv) the spool 122 slidably accommodated within the sleeve 108; (v) the annular chamber 130 formed between an exterior surface of the spool 122 and an interior surface of the sleeve 108, wherein the annular chamber 130 is fluidly coupled to the first port 110 (e.g., via the longitudinal channels 200, 202), and wherein a first flow area (e.g., the annular flow area 140) is formed between the spool 122 and the sleeve 108 to fluidly couple the annular chamber 130 to the second port 112 via the first flow area.

At block 604, the method 600 includes in response to the electrical command signal, applying a solenoid force to the spool 122.

At block 606, the method 600 includes causing the spool 122 to move axially within the sleeve 108.

At block 608, the method 600 includes forming a second flow area (e.g., the annular flow area 400) between the spool 122 and the sleeve 108, thereby fluidly coupling the third port 118 to the annular chamber 130 via the second flow area.

At block 610, the method 600 includes providing fluid from the third port 118 through the second flow area to the annular chamber 130 and the first port 110 and from the annular chamber 130 through the first flow area to the second port 112, wherein the first flow area and the second flow area operate as flow restrictions such that fluid received at the annular chamber 130 and the first port 110 from the third port 118 through the second flow area and communicated from the annular chamber 130 to the second port 112 through the first flow area has a reduced pressure level compared to pressure level received from the source at the third port 118 and a higher pressure level than pressure level at the second port 112.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a plurality of ports comprising: (i) a first port, (ii) a second port configured to be fluidly coupled to a reservoir, and (iii) a third port configured to be fluidly coupled to a source of fluid;
   a sleeve having a longitudinal cylindrical cavity therein;
   a spool slidably accommodated in the longitudinal cylindrical cavity of the sleeve;
   an annular chamber formed between an exterior surface of the spool and an interior surface of the sleeve, wherein the annular chamber is fluidly coupled to the first port, and wherein a first flow area is formed between the spool and the sleeve to fluidly couple the annular chamber to the second port via the first flow area; and
   a solenoid actuator comprising: a solenoid coil, a pole piece, and an armature that is mechanically coupled to the spool, such that when the solenoid coil is energized, a solenoid force is applied to the armature and the spool coupled thereto, thereby (i) causing the armature and the spool to move axially toward the pole piece, and (ii) forming a second flow area between the spool and the sleeve to fluidly couple the third port to the annular chamber via the second flow area, such that the annular chamber is fluidly coupled to both the second port and the third port, wherein the second flow area operates as a flow restriction such that fluid received at the annular chamber and the first port from the third port through the second flow area has a lower pressure level compared to pressure level received from the source at the third port.

2. The valve of claim 1, wherein the first port, the second port, and the third port are axially-spaced along a length of the valve such that the second port is interposed between the first port and the third port.

3. The valve of claim 1, wherein the annular chamber is fluidly coupled to the first port via a plurality of longitudinal channels formed in the sleeve and symmetrically disposed about the spool.

4. The valve of claim 1, wherein the first flow area operates as a respective flow restriction such that fluid received at the annular chamber and communicated to the second port through the first flow area has a higher pressure level than pressure level at the second port.

5. The valve of claim 1, further comprising:
   a spring disposed about the exterior surface of the spool and configured to apply a biasing force in a distal direction on the spool, wherein the solenoid force acts on the spool in a proximal direction, and wherein fluid from the annular chamber applies a fluid force on the spool in the distal direction, such that an axial position of the spool within the sleeve is based on a force equilibrium between the solenoid force, the biasing force, and the fluid force.

6. The valve of claim 5, wherein the fluid force is a first fluid force, and wherein the valve further comprises:
   a reservoir chamber formed at a distal end of the spool within the sleeve, wherein the reservoir chamber is fluidly coupled to the second port, wherein fluid in the reservoir chamber applies a second fluid force on the spool in the proximal direction, such that the axial position of the spool is further based on the second fluid force.

7. The valve of claim 6, wherein the second port comprises:
   a first set of reservoir cross-holes configured to fluidly couple the second port to the reservoir chamber; and
   a second set of reservoir cross-holes axially-spaced from the first set of reservoir cross-holes and configured to fluidly couple the annular chamber to the second port.

8. The valve of claim 6, further comprising:
   a disk disposed within the sleeve and configured to isolate the first port from the reservoir chamber.

9. The valve of claim 1, wherein the first port is formed at a distal end of the sleeve, wherein the second port comprises a plurality of reservoir cross-holes formed in a circumferential array about the sleeve, and wherein the third port comprises a plurality of inlet flow cross-holes formed in a respective circumferential array about the sleeve.

10. The valve of claim 1, wherein the solenoid actuator further comprises a solenoid tube comprising: (i) a cylindrical body, and (ii) a solenoid chamber formed within the cylindrical body and configured to slidably accommodate the armature therein, wherein the solenoid chamber is fluidly coupled to the annular chamber such that when the solenoid coil is energized and the second flow area is formed, pressure level of fluid in the solenoid chamber is equal to pressure level of fluid in the annular chamber and at the first port.

11. A hydraulic system comprising:
    a source of fluid;
    a reservoir;
    a directional control valve having (i) a main spool shiftably disposed therein, and a pilot chamber disposed at an end of the main spool; and
    a valve comprising: (i) a first port fluidly coupled to the pilot chamber of the directional control valve to provide a pilot pressure signal thereto and shift the main spool when the valve is actuated, (ii) a second port fluidly coupled to the reservoir, and (iii) a third port fluidly coupled to the source of fluid, and wherein the valve further comprises:
    a sleeve having a longitudinal cylindrical cavity therein,
    a spool slidably accommodated in the longitudinal cylindrical cavity of the sleeve,
    an annular chamber formed between an exterior surface of the spool and an interior surface of the sleeve, wherein the annular chamber is fluidly coupled to the first port, and wherein a first flow area is formed between the spool and the sleeve to fluidly couple the annular chamber to the second port via the first flow area, and
    a solenoid actuator comprising: a solenoid coil, a pole piece, and an armature that is mechanically coupled to the spool, such that when the solenoid coil is energized to actuate the valve, a solenoid force is applied to the armature and the spool coupled thereto, thereby (i) causing the armature and the spool to move axially toward the pole piece, and (ii) forming a second flow area between the spool and the sleeve to fluidly couple the third port to the annular chamber via the second flow area, such that the annular chamber is fluidly coupled to both the second port and the third port, wherein the second flow area operates as a flow restriction such that fluid received at the annular chamber and the first port from the third port through the second flow area has a lower pressure level compared to pressure level received from the source at the third port.

12. The hydraulic system of claim 11, wherein the first flow area operates as a respective flow restriction such that fluid received at the annular chamber and communicated to the second port through the first flow area has a higher pressure level than pressure level at the second port.

13. The hydraulic system of claim 11, wherein the annular chamber is fluidly coupled to the first port via a plurality of longitudinal channels formed in the sleeve and symmetrically disposed about the spool.

14. The hydraulic system of claim 11, wherein the valve further comprises:
a spring disposed about the exterior surface of the spool and configured to apply a biasing force in a distal direction on the spool, wherein the solenoid force acts on the spool in a proximal direction, and wherein fluid from the annular chamber applies a fluid force on the spool in the distal direction, such that an axial position of the spool within the sleeve is based on a force equilibrium between the solenoid force, the biasing force, and the fluid force.

15. The hydraulic system of claim 14, wherein the fluid force is a first fluid force, and wherein the valve further comprises:
a reservoir chamber formed at a distal end of the spool within the sleeve, wherein the reservoir chamber is fluidly coupled to the second port, wherein fluid in the reservoir chamber applies a second fluid force on the spool in the proximal direction, such that the axial position of the spool is further based on the second fluid force.

16. The hydraulic system of claim 15, wherein the second port comprises:
a first set of reservoir cross-holes configured to fluidly couple the second port to the reservoir chamber; and
a second set of reservoir cross-holes axially-spaced from the first set of reservoir cross-holes and configured to fluidly couple the annular chamber to the second port.

17. The hydraulic system of claim 15, wherein the valve further comprises a disk disposed within the sleeve and configured to isolate the first port from the reservoir chamber.

18. The hydraulic system of claim 11, wherein the solenoid actuator further comprises a solenoid tube comprising: (i) a cylindrical body, and (ii) a solenoid chamber formed within the cylindrical body and configured to slidably accommodate the armature therein, wherein the solenoid chamber is fluidly coupled to the annular chamber such that when the solenoid coil is energized and the second flow area is formed, pressure level of fluid in the solenoid chamber is equal to pressure level of fluid in the annular chamber and at the first port.

19. A method comprising:
receiving an electrical command signal energizing a solenoid coil of a valve, wherein the valve comprises: (i) a first port, (ii) a second port configured to be fluidly coupled to a reservoir, (iii) a third port configured to be fluidly coupled to a source of fluid, (iv) a spool slidably accommodated within a sleeve, and (v) an annular chamber formed between an exterior surface of the spool and an interior surface of the sleeve, wherein the annular chamber is fluidly coupled to the first port, and wherein a first flow area is formed between the spool and the sleeve to fluidly couple the annular chamber to the second port via the first flow area;
in response to the electrical command signal, applying a solenoid force to the spool;
causing the spool to move axially within the sleeve;
forming a second flow area between the spool and the sleeve, thereby fluidly coupling the third port to the annular chamber via the second flow area; and
providing fluid from the third port through the second flow area to the annular chamber and the first port and from the annular chamber through the first flow area to the second port, wherein the first flow area and the second flow area operate as flow restrictions such that fluid received at the annular chamber and the first port from the third port through the second flow area and communicated from the annular chamber to the second port through the first flow area has a reduced pressure level compared to pressure level received from the source at the third port and a higher pressure level than pressure level at the second port.

20. The method of claim 19, wherein the valve further comprises, a pole piece, and an armature that is mechanically coupled to the spool, and wherein applying the solenoid force to the spool comprises:
applying the solenoid force to the armature and the spool coupled thereto, thereby causing the armature and the spool to move axially toward the pole piece and forming the second flow area.

* * * * *